(12) United States Patent
Møller (10) Patent No.: US 7,967,009 B2
(45) Date of Patent: Jun. 28, 2011

(54) SOLAR COLLECTOR

(75) Inventor: Brent Møller, Gentofte (DK)

(73) Assignee: VKR Holding A/S, Horsholm (DK)

(*) Notice: Subject to any disclaimer, the term of this patent is extended or adjusted under 35 U.S.C. 154(b) by 783 days.

(21) Appl. No.: 11/993,016

(22) PCT Filed: Jun. 16, 2006

(86) PCT No.: PCT/EP2006/005812
§ 371 (c)(1), (2), (4) Date: Dec. 18, 2007

(87) PCT Pub. No.: WO2006/136341
PCT Pub. Date: Dec. 28, 2006

(65) Prior Publication Data
US 2010/0212658 A1    Aug. 26, 2010

(51) Int. Cl.
*F24J 2/46* (2006.01)
(52) U.S. Cl. .................... 126/704; 126/621; 126/623
(58) Field of Classification Search .................. 126/621, 126/623, 704
See application file for complete search history.

(56) References Cited

U.S. PATENT DOCUMENTS

| | | | | |
|---|---|---|---|---|
| 1,983,958 A * | 12/1934 | Wolbers | ........................... | 165/76 |
| 2,506,642 A * | 5/1950 | Jacobi | ........................... | 180/90 |
| 3,228,359 A * | 1/1966 | Rich, Jr. | ........................... | 108/156 |
| 3,730,464 A * | 5/1973 | Kelly | ........................... | 248/57 |
| 3,987,784 A * | 10/1976 | Godrick | ........................... | 126/661 |
| 4,030,478 A | 6/1977 | Beaver et al. | | |
| 4,043,317 A * | 8/1977 | Scharfman | ........................... | 126/596 |
| 4,062,351 A * | 12/1977 | Hastwell | ........................... | 126/571 |
| 4,067,317 A * | 1/1978 | Hubbard | ........................... | 126/664 |
| 4,122,828 A * | 10/1978 | DiPeri | ........................... | 126/671 |
| 4,164,933 A * | 8/1979 | Alosi | ........................... | 126/621 |
| 4,170,220 A * | 10/1979 | Smith | ........................... | 126/628 |
| 4,210,122 A * | 7/1980 | Artweger | ........................... | 126/622 |
| 4,219,010 A * | 8/1980 | Van Heel | ........................... | 126/620 |
| 4,224,924 A * | 9/1980 | Wilson | ........................... | 126/592 |
| 4,232,655 A * | 11/1980 | Frissora et al. | ........................... | 126/585 |
| 4,244,355 A * | 1/1981 | Stout | ........................... | 126/622 |
| 4,262,658 A * | 4/1981 | Frissora | ........................... | 126/655 |
| 4,267,822 A * | 5/1981 | Diamond | ........................... | 126/587 |
| 4,269,173 A * | 5/1981 | Krueger et al. | ........................... | 126/634 |
| 4,281,642 A * | 8/1981 | Steinberg | ........................... | 126/661 |
| 4,281,643 A * | 8/1981 | Kibblewhite | ........................... | 126/704 |
| 4,284,070 A * | 8/1981 | Wilke | ........................... | 126/710 |
| 4,289,120 A * | 9/1981 | Ward | ........................... | 126/623 |

(Continued)

FOREIGN PATENT DOCUMENTS

DE    2623642 A1    12/1977

(Continued)

*Primary Examiner* — Kenneth B Rinehart
*Assistant Examiner* — Jorge Pereiro
(74) *Attorney, Agent, or Firm* — K. David Crockett, Esq.; Niky Economy Syrengelas, Esq.; Crockett & Crockett, PC (57) ABSTRACT

A glazed solar collector with a frame surrounding an absorber (3a), an insulating layer (2) disposed beneath the absorber (3a) and a cover pane (4) spaced above the absorber (3a). Absorber tubing (3b) is connected to an supply header (15) and to an return header (16). The axis (X) of the supply/return header (15,16) is arranged at an angle to a plane (Z) coinciding with the cover pane (4) with the distance between the axis (X) and the plane (2) increasing along the axis (X) in a direction leading away from the collector.

6 Claims, 8 Drawing Sheets

U.S. PATENT DOCUMENTS

| | | | | |
|---|---|---|---|---|
| 4,297,525 A | * | 10/1981 | Bowden, Jr. | 174/58 |
| 4,304,957 A | * | 12/1981 | Slater et al. | 174/666 |
| 4,312,325 A | * | 1/1982 | Voges et al. | 126/588 |
| 4,313,429 A | * | 2/1982 | McAlaster | 126/667 |
| 4,335,708 A | * | 6/1982 | Holter et al. | 126/676 |
| 4,347,093 A | * | 8/1982 | Mayo et al. | 156/242 |
| 4,377,156 A | * | 3/1983 | Schelzig | 126/704 |
| 4,393,862 A | * | 7/1983 | Wilke | 126/664 |
| 4,399,808 A | * | 8/1983 | Frissora et al. | 126/583 |
| 4,422,443 A | * | 12/1983 | Arendt | 126/570 |
| 4,426,998 A | * | 1/1984 | DuBosque, Jr. | 126/623 |
| 4,433,674 A | * | 2/1984 | Gilleland | 126/659 |
| 4,471,764 A | * | 9/1984 | Calvert et al. | 126/704 |
| 4,517,961 A | * | 5/1985 | Bloor et al. | 126/622 |
| 4,519,380 A | * | 5/1985 | Laing | 126/583 |
| 4,946,512 A | * | 8/1990 | Fukuroi et al. | 136/248 |
| 4,971,028 A | * | 11/1990 | Fagan | 126/633 |
| 5,174,081 A | * | 12/1992 | Reichartz | 52/263 |
| 5,988,825 A | * | 11/1999 | Masters et al. | 362/20 |
| 6,158,066 A | * | 12/2000 | Brown et al. | 4/695 |
| 6,375,128 B1 | * | 4/2002 | Condon et al. | 248/57 |
| 6,796,335 B1 | * | 9/2004 | Hubbard et al. | 138/106 |
| 7,140,121 B2 | * | 11/2006 | Casella et al. | 34/201 |
| 7,203,416 B2 | * | 4/2007 | Craw et al. | 392/350 |
| 7,520,474 B1 | * | 4/2009 | Condon | 248/56 |
| 2005/0235409 A1 | * | 10/2005 | Sisk | 4/541.1 |
| 2006/0137211 A1 | * | 6/2006 | Casella et al. | 34/231 |

FOREIGN PATENT DOCUMENTS

| | | |
|---|---|---|
| EP | 0601443 A | 6/1994 |
| GB | 2009917 A | 6/1979 |

* cited by examiner

SOLAR COLLECTOR

The present invention relates to glazed solar collectors and methods for producing such collectors. Such solar collectors typically have a rectangular frame containing an absorber, an insulating layer beneath the absorber, and a cover pane spaced above the absorber. The collectors are particularly suitable to be integrated into a pitched roof, but may also be installed on a flat roof by means of a mounting frame.

BACKGROUND ART

Numerous types of flat plate collector panel assemblies have been devised for solar installations. In flat plate collectors, customarily an absorber plate is deployed which is suitably comprised of steel, aluminum or copper plate coated with a mat black paint and characterized by its ability to absorb radiant energy and convert it to heat. The absorber plate is covered by a cover pane in order to reduce the heat loss from the plate without a corresponding reduction in the heat input due to the selective transmittance of the sun's rays by the glass or glazing. A thermal fluid, such as water, is circulated as a conducting medium in thermal contact with the absorber plate to remove some of the heat absorbed by the plate and this is typically done through the utilization of spaced parallel tubes mounted on the rear side of the absorber plate. The fluid-circulating tubes are connected to a common supply header at one end of the plate and to a return header at another end for transferring the thermal fluid from the tubing into a suitable heat storage area.

An insulating layer is disposed beneath the absorber plate and additional insulating layers may be disposed in surrounding relation to the absorber plate. The entire collector is assembled within a frame or tray generally comprised of a flat bottom and metal or wooden outer side- and end panels.

The supply- and return headers of on-roof collectors normally exit sideward from the frame, i.e. protrude through the collector panels with the header axis parallel to the plane of the cover pane. Thus, juxtaposed on-roof collectors can be connected by means of connecting tubing disposed above the roof that connects the return header of the one collector to the supply of the neighboring collector.

With in-roof collectors this type of construction is not possible, since a U-shaped flashing is disposed between neighboring collectors to ensure that water from precipitation will not reach the roof construction. The bottom of the U-shaped flashing is substantially level with the bottom of the collectors. The connecting tubing must pass below the U-shaped flashing. Therefore, the supply- and return header of known in-roof collectors, such as the Velux® CLI collector, are located a bracket that protrudes downwardly from the bottom of the collector, so that the sidewardly directed header axis and any connecting tubing is disposed below the U-shaped flashing. However, the downwardly projecting brackets increase the overall height of the collector thus leading to an increased volume of the shipment packaging. Further, the downwardly protruding header brackets are vulnerable to damage during manufacturing, transport and mounting on a roof.

It is therefore proposed to provide a solar collector for in-roof mounting that is robust, easy to manufacture, to transport and to install.

DISCLOSURE OF THE INVENTION

On this background, it is an object of the present invention to provide an improved solar collector. This object is achieved in accordance with claim 1 by providing a solar collector comprising an absorber plate, an insulating layer beneath the absorber plate, a cover pane spaced above the absorber plate, an outer frame surrounding the periphery of the insulating layer, absorber tubing connected to an supply header and to an return header, whereby the axis of the supply- and/or return header is arranged at an angle to a plane coinciding with the cover pane with the distance between the axis and the plane increasing along the axis in a direction leading away from the collector.

Due to the angle of the header axis, a tube connected to the supply/return headers will slope downwardly away from the collector, and thereby pass under the U-shaped flashing. Thus, a curved and/or flexible connecting tube can connect two juxtaposed collectors and pass under the U-shaped flashing without the need for brackets that project downwardly on the bottom of the collectors.

The cover pane, the outer frame and the insulation layer with or without a backsheet may form a casing and the supply- and/or return headers are disposed close to the bottom of the casing.

The supply- and/or return header can be mounted on a bracket that is fastened to the outer frame and includes a sloping surface with an aperture for receiving the supply- or return header therein.

The sloping surface can be countersunk in the casing so that the portion of the header projecting outwardly from the sloping surface does not protrude from the casing. Thus, the overall cross-sectional shape of the collector is substantially rectangular, without any protruding parts that are vulnerable to being damaged. Further, the absence of protruding parts allows a smaller packaging and transport format.

Preferably, the sloping surface extends all the way up to a side panel of the frame so that the countersunk area opens up to the side panel to thereby allow a key for tightening a nut or ring of external (connecting) tubing to be inserted into the countersunk area.

Further objects, features, advantages and properties of the solar collector according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

The preferred embodiment of the invention will be described specifically with reference to a flat plate collector assembly although it is understood that other absorber types may be employed with a minimum change in construction.

Figure 1:
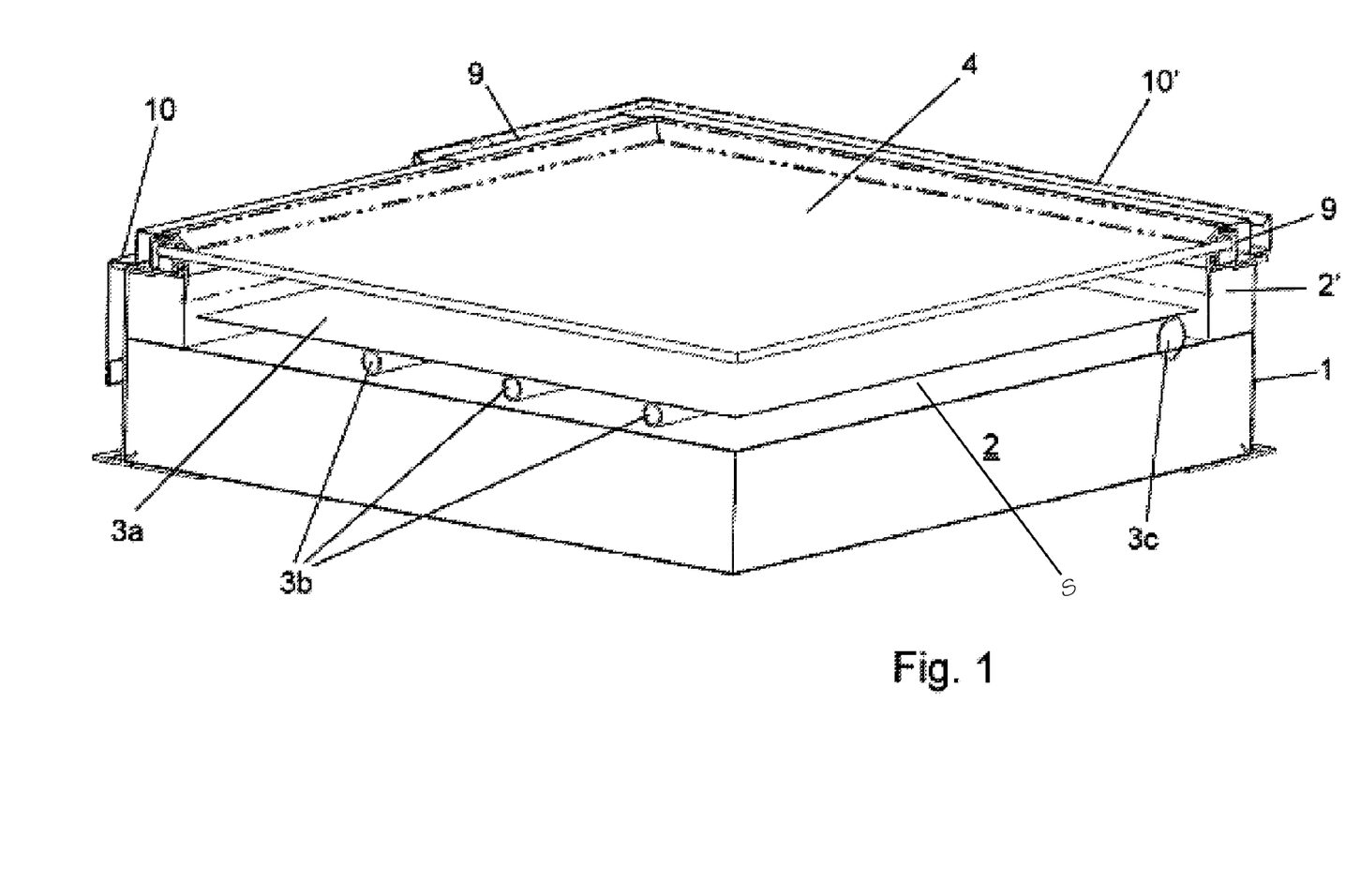
FIG. 1 is a perspective cutaway view of a solar collector in accordance with the present invention.
Figure 2:
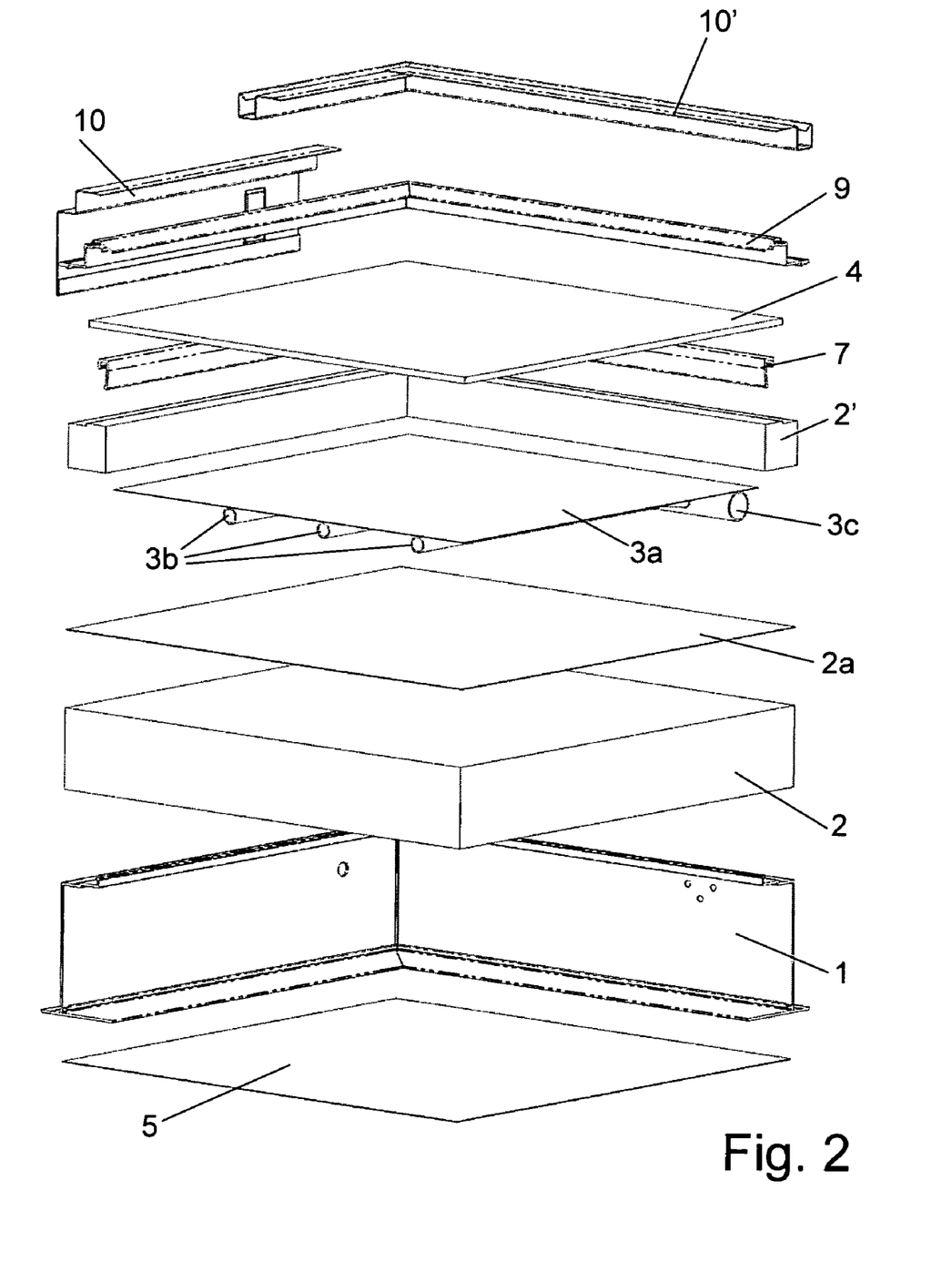
FIG. 2 is an exploded view of FIG. 1.

FIG. 1 shows by way of illustrative example a flat plate solar energy collector, whilst FIG. 2 is the corresponding exploded view. Seen in cutaway perspective view of FIGS. 1 and 2 the solar collector has a frame, an insulation layer 2, an absorber plate 3a and a cover pane 4 with a space S between the cover pane 4 and the absorber plate 3a. The frame, the insulator layer 2 and the cover pane 4 form a case with an enclosure. The enclosure is used to provide support for the absorber plate 3a, and to protect the collector from heat loss due to wind, plus the important function of keeping moisture from rain, snow and dew out of the collector.

The frame includes a backsheet 5 and outer side- and end panels 1. The insulation layer 2 is formed by a mat of mineral- or glass wool material, but could also be formed by a layer of rigid foam urethane (PUR) or polyisocyanurate (PIR). All these materials have an excellent insulation value per unit of thickness and are easy to handle because they are very light.

The upper surface of the insulation layer 2 is covered with a reflective silver foil 2a. Additional insulating layers 2' are disposed in surrounding relation to the absorber plate 3a.

The backsheet 5 protects the insulation layer 2 from weather influences and increases the rigidity of the construction. The backsheet 5 is suitably formed of metal, i.e. steel or aluminum.

The absorber comprises an absorber plate 3a and absorber tubing 3b, 3c that channels the medium, typically water, used to transport the collected thermal energy. The absorber plate 3a and the tubing 3b,3c may suitably consist of steel, copper or aluminum sheet or tubing, respectively. The absorber plate 3a and tubing 3b,3c penetrating the casing are thermally insulated from the casing at all points of support.

The absorber plate 3a is provided with a semi-selective or a selective coating to improve the heat absorbing capacity of the absorber plate 3a.

The absorber tubing is attached to the rear side of the absorber plate by a suitable technique, such as welding or soldering and includes two tubes 3c with a larger diameter extending along two opposite edges of the absorber plate 3a. The two tubes 3c interconnected by a plurality spaced parallel lesser diameter tubes 3b extending between the large diameter tubes in a direction substantially transverse to the large diameter tubes 3c. Although not shown, all tubing 3b and 3c may be of equal diameter.

The two larger diameter tubes 3c are connected via sections of flexible tubing (not shown) to an supply header (not shown) and an return header (not shown), respectively. The flexible tubing sections ensure that the absorber plate 3a and absorber tubing 3c can thermally expand and contract without any tension building up at the connection between the absorber tubing 3b,3c and the frame.

Figure 3:
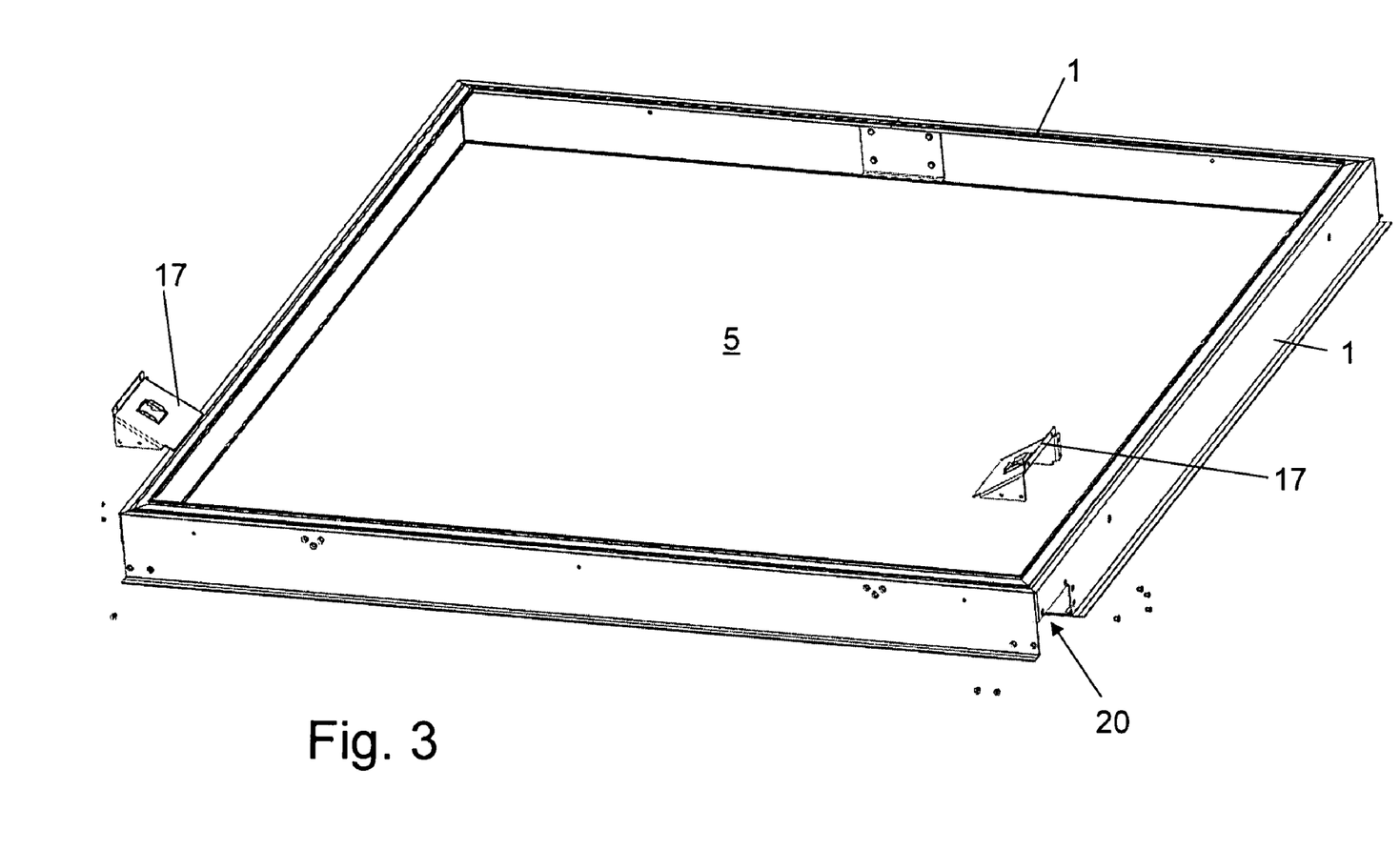
FIG. 3 is a perspective view of the frame with the backsheet mounted therein and header brackets about to be mounted therein of a solar collector in accordance with the present invention.

With reference to FIG. 3, the frame comprises four panels 1—two side panels and two end panels—that are part of one extruded profile. The profile is preferably made of aluminum, and notched at the corners of the frame to allow a rectangular frame to be formed by folding of a single extruded profile.

Near to the lower ("lower" as in a pitch roof mounted collector) end panel 1 a recess 20 has been cut out from the side panels 1 and from the backsheet 5.

Figure 4:
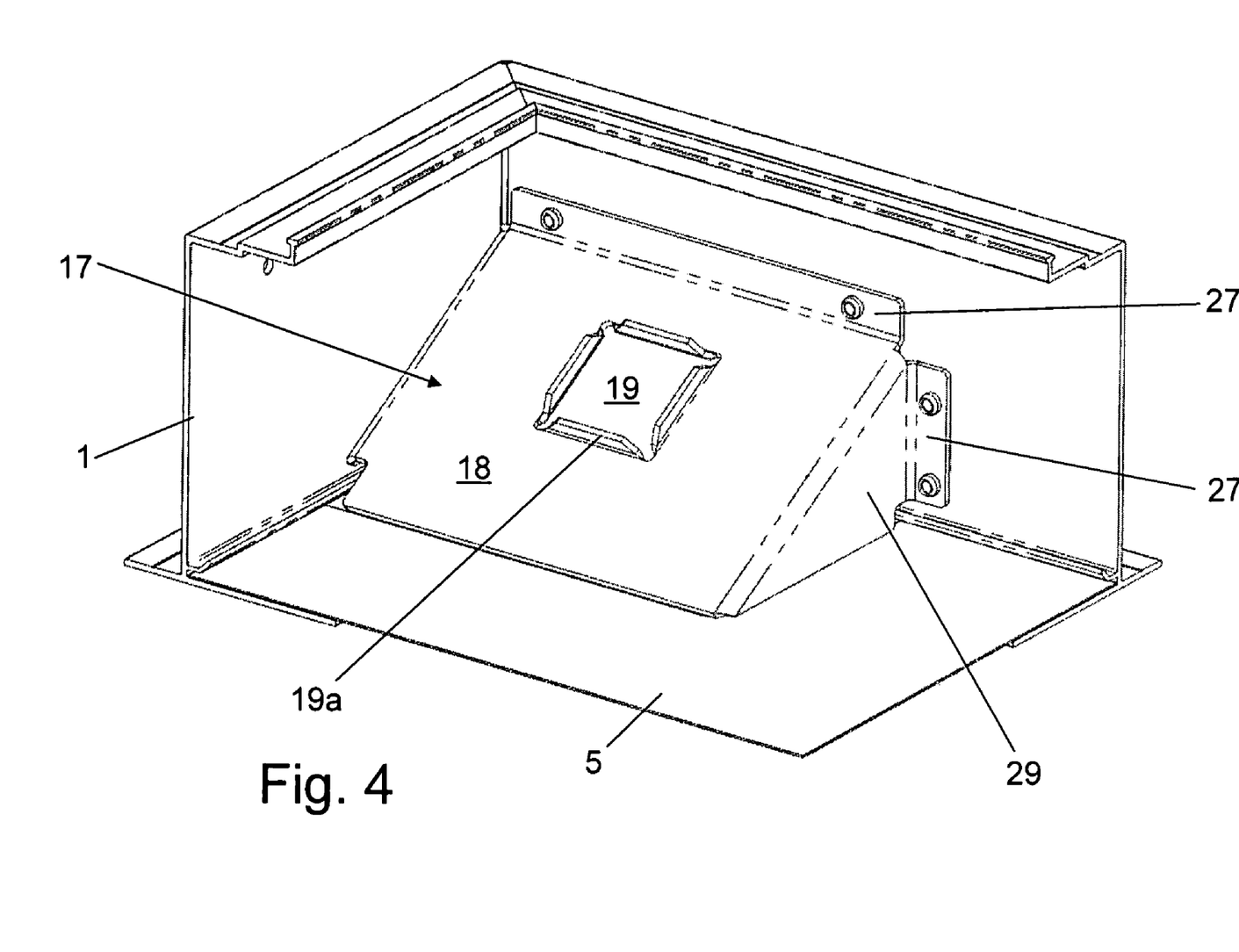
FIG. 4 is detailed view of a header bracket mounted in a corner of a solar collector in accordance with the present invention.

As shown in FIG. 4, the recess 20 is covered by a header bracket 17. The header bracket 17 includes a sloping plate 18 with several bended lips 27 that are provided with bores though which the header bracket is fastened to a side panel 1 by fasteners, e.g. pop rivets. The header bracket 17 includes two downwardly projecting side walls 29. One of the downwardly projecting side walls 29 may include a bended foot (not shown) resting on the backsheet 5, whilst the other downwardly projecting side wall 29 is arranged beside the lower end panel 1 and fastened thereto by e.g. pop-rivets.

Centrally in the sloping plate 18 an aperture 19 with a squared perimeter serves to receive the supply or return header. A part of the supply- and return header 15, 16 is provided with a matching squared cross-section, so that the headers 15,16 cannot rotate relative to the header bracket 17. The perimeter of the aperture 19 is formed by plate material that is bend over about 90° to form one or more lips 19a that increase the contact area between said supply- and/or return header and the plate, in order to be able to withstand the relatively large torque that the headers need to withstand when external tubing is secured thereto.

Figure 5:
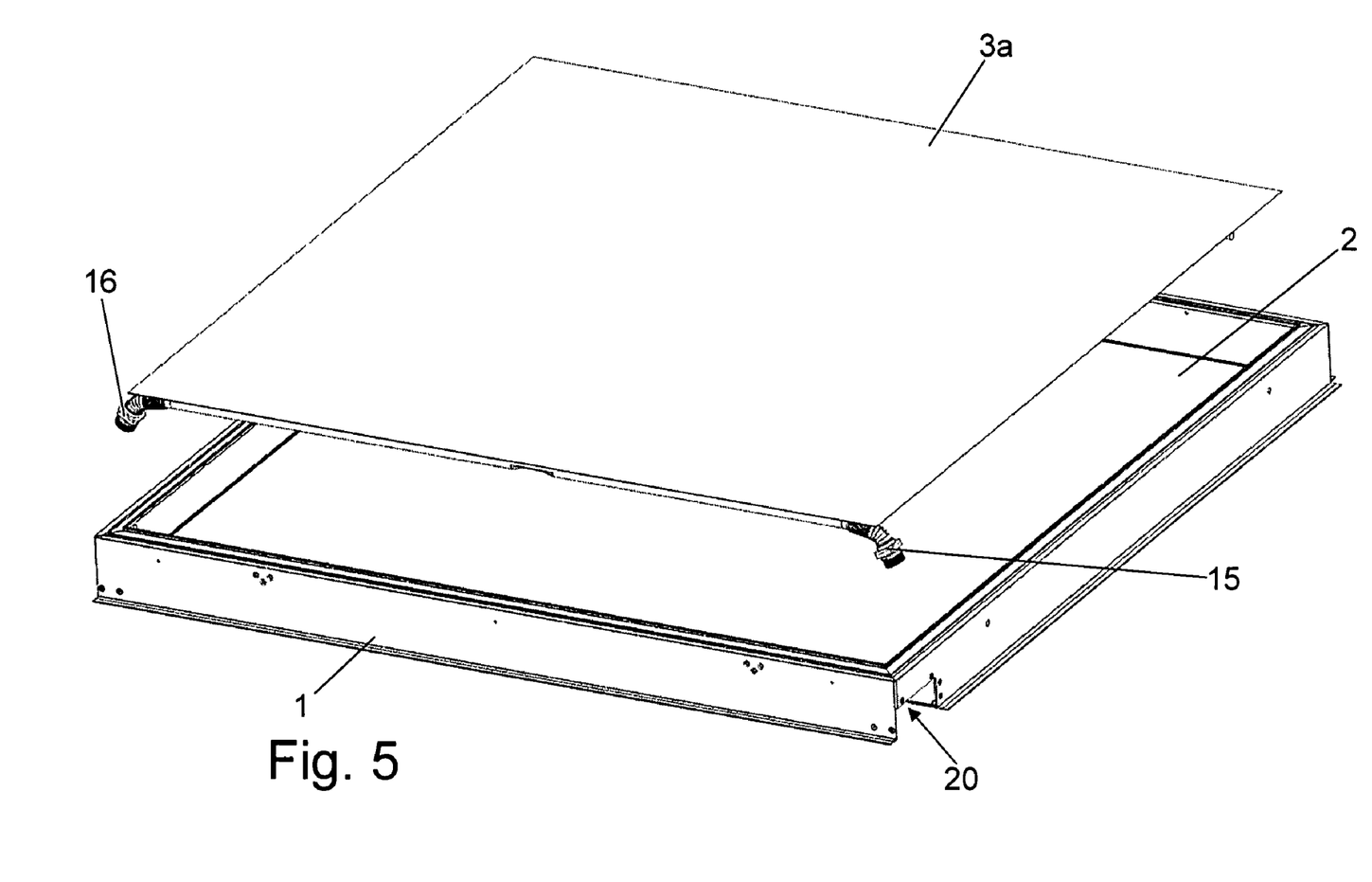
FIG. 5 is the perspective view of FIG. 3 with the header brackets mounted therein and the absorber including the headers about to be mounted therein.

FIG. 5 shows the absorber plate just before mounting into the frame. The insulation layer 2 is already placed in the frame and rests on the backsheet 5. The supply/return headers 15,16 are suspended from the absorber tubing at a downward angle.

Figure 6:
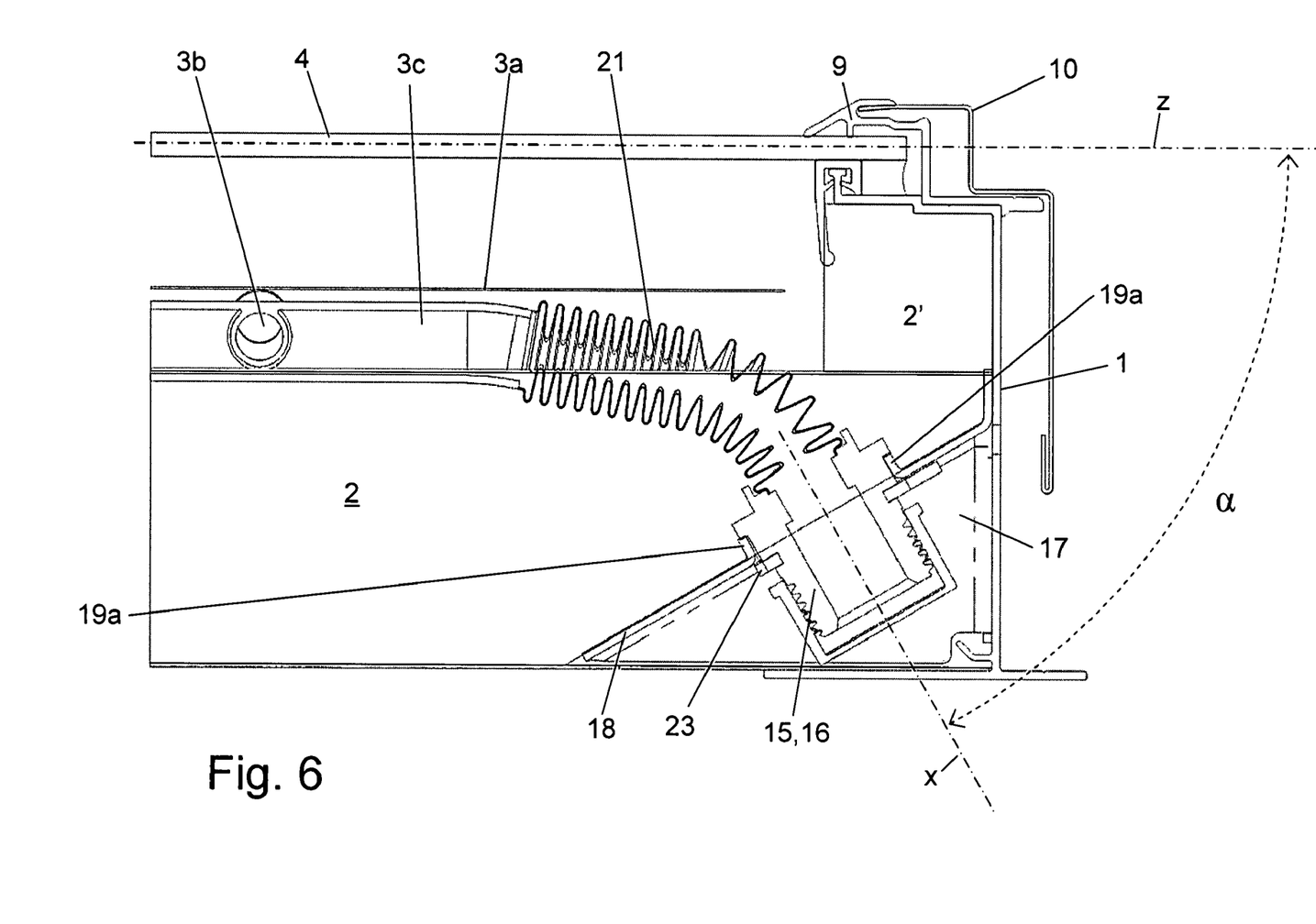
FIG. 6 is a detailed cross-sectional view through a side panel and a header of a solar collector in accordance with the present invention.
Figure 7:
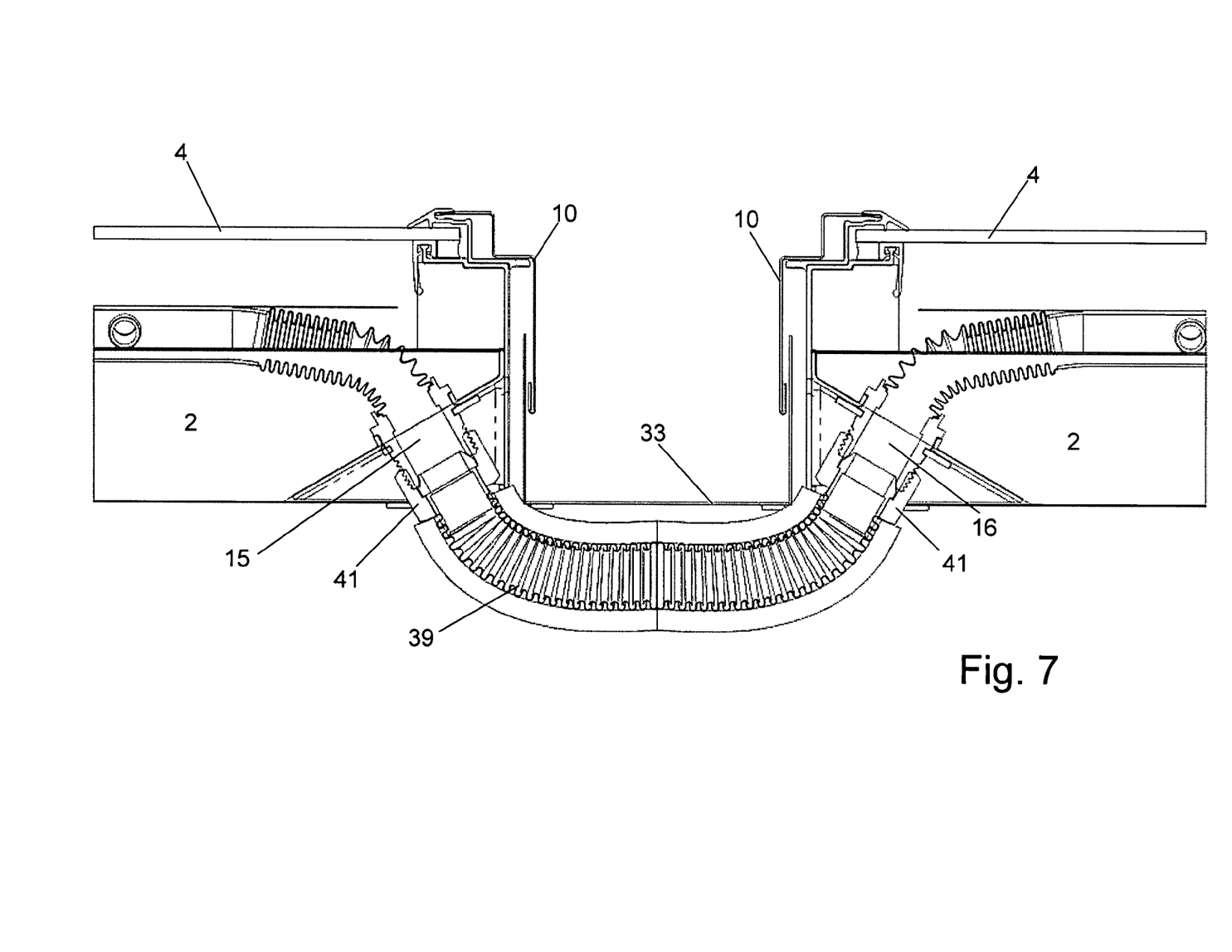
FIG. 7 is a view illustrating the connection between two solar collectors.

FIG. 6 is a cross-sectional view though a side panel and a supply-return header 15, 16 in detail. The header and side panel on the other side of the collector are as shown in FIG. 7 a mirror image of the header and side panel shown in FIG. 6. The side panels 1 are profiles with an upper inwardly directed attachment ledge 1a (an outwardly directed ledge could also be provided) and a bottom inwardly and outwardly directed ledge or foot 1b. The inner end of the upper ledge 1a is provided with an upstanding rim 1c.

The upstanding rim 1c acts as a spacer that supports the cover pane 4 and maintains a distance between the upper surface of ledge 1a and the bottom surface of the cover pane 4 during fitting of the cover pane. A continuous EPDM neoprene gasket 7 is placed on the upstanding rims 1c. The gasket 7 is in sealing abutment with a peripheral zone of the bottom surface of the cover pane 4 to form a moisture barrier protecting the enclosure and to insulate the cover pane 4 thermally from the end- and side panels 1.

When the gasket has been placed on the rim 1c, the cover pane 4 is placed on top of the gasket 7 and the space between the upper side of the attachment ledge 1a and the bottom surface of the cover pane 4 is filled with a flexible adhesive sealant such as a silicone based sealant in liquid form. The gasket 7 also serves as a barrier preventing the liquid flexible adhesive sealant from entering the cavity when it is applied.

When the sealant has cured it forms a flexible layer 8 that securely attaches the cover pane 4 to the end- and side panels 1. The layer of flexible adhesive sealant 8 also forms a second moisture barrier protecting the enclosure.

The layer of flexible adhesive sealant 8 attaches the cover pane 4 to the side panels so that the cover pane 4 becomes an integral bearing part of the construction that contributes to the overall stability and stiffness of the solar collector.

The collector is provided with a protective stripping 9 and flashing 10.

The cover pane 4 is in all the described embodiments preferably made from tempered glass, i.e. a strong and durable glass quality. However, the edges of the pane are particularly sensitive to mechanical impact and could be damaged by objects hitting the edge (e.g. hailstones), leading to a chipped or cracked cover pane. The protective stripping 9 protects the cover pane 4 from mechanical impact. The protective stripping 9 also serves to protect the silicon layer 8 from weather influences such as moist and direct sunlight. A ventilation space is provided between the protective stripping 9 and the silicon layer 8.

The supply/return header 15,16 includes a hollow body with a though going bore that defines a header axis "x". One end of the header body is connected via a section of flexible tubing 21 to the curved ends of the absorber tube 3c. The flexible tubing 21, allows the absorber tube 3c to freely thermally expand and contract and facilitates the assembly of the header 15,16 and the absorber into the frame. The header 15,16 is inserted in the squared aperture 19 with a shoulder of the header 15,15 abutting with the upper surface of the lips 19a. On the opposite side of the sloped plate 18 a spring ring or similar fastener ensures that the header 15,16 cannot be pushed out of the aperture 19.

The portion of the header 15,16 that protrudes outward from the sloped plate 17 is provided with thread for engaging a threaded ring or nut 41 of an external tubing 39 shown in FIG. 7.

The angle of the sloping plate 18 determines the obtuse angle α formed between the header axis and a plane "z" coinciding with the cover pane 4. The distance between the axis "x" and the plane "z" increases along the axis "x" in a direction leading away from the collector. The optimal value for angle may vary in accordance with circumstances, such as the flexibility and diameter of the connecting tubing 39.

The sloping plate 18 is countersunk in the casing and the portion of the supply/return header 15,16 projecting outwardly from the sloping plate 18 does not protrude from the casing, thereby obtaining a collector with a substantially rectangular cross-sectional shape without any parts protruding therefrom.

FIG. 7 shows two solar collectors that are connector to one another via a flexible tubing 39. The header bracket 17 is disposed close to the bottom of the case, to that an external connecting tubing 19 projects from the case close to the bottom and directed away from the cover pane 4. The exterior tubing 39 connected to the supply/return header 15,16 is thus disposed below the plane of the backsheet 5 and passes well below the U-shaped flashing 39 between two juxtaposed solar collectors.

Figure 8:
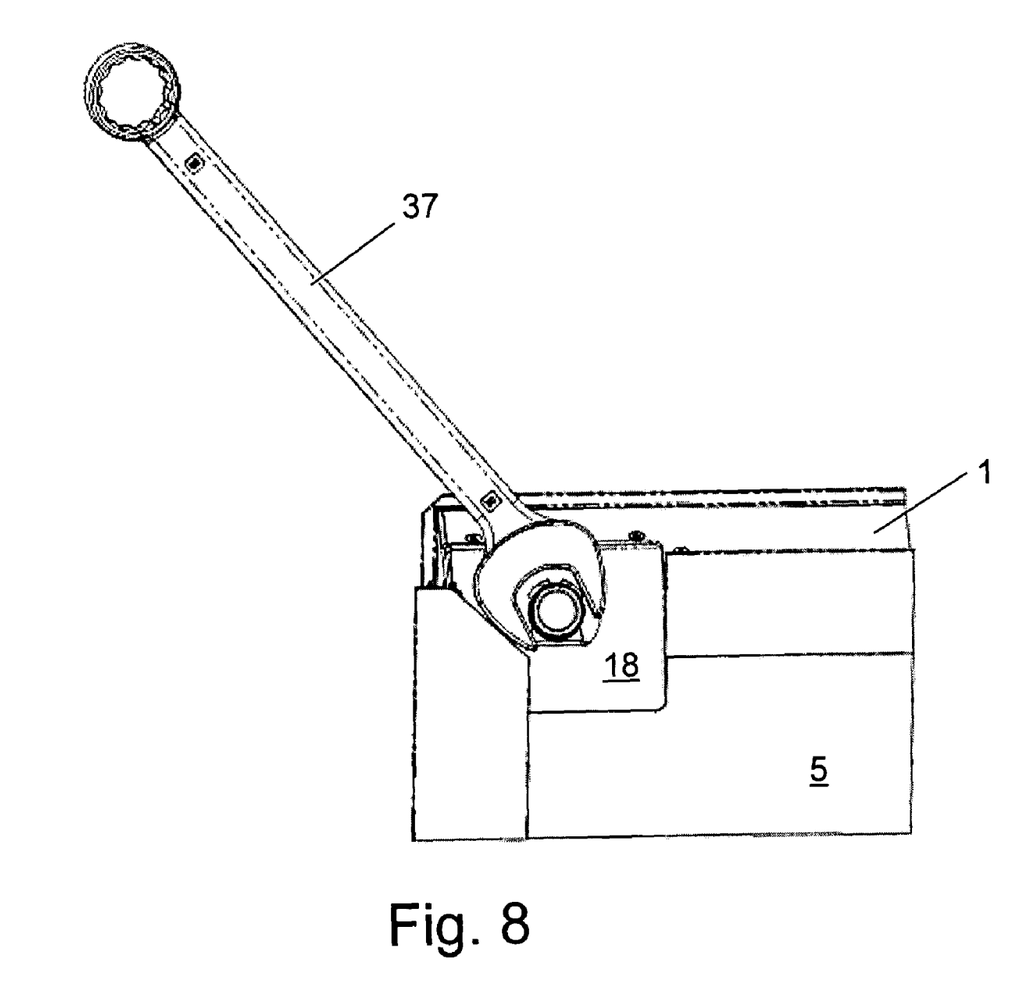
FIG. 8 is a perspective view illustrating the use of a key in a countersunk header bracket in a solar collector in accordance with the present invention.

As shown in FIG. 8, the sloping plate 18 extends all the way up to the side panel 1, so that the countersunk area opens up to the side panel and allows a key 37 for tightening a nut of the connecting tubing 39 to be insured in the countersunk area.

Although the present invention has been described in detail for purpose of illustration, it is understood that such detail is solely for that purpose, and variations can be made therein by those skilled in the art without departing from the scope of the invention.

The invention claimed is:

1. A solar collector comprising:
   an absorber plate (3a),
   an insulating layer (2) beneath the absorber plate,
   a cover pane (4) arranged above the absorber plate and defining a space between said cover pane and said absorber plate,
   an outer frame (1) surrounding the periphery of the insulating layer,
   absorber tubing (3b,3c) attached to said absorber plate and connected to an supply header (15) and to an return header (16),
   the axis of the supply- and/or return header (15,16) being arranged at an angle to a plane coinciding with the cover pane (4) with the distance between the axis and the plane increasing along the axis in a direction leading away from the collector,
   characterized in that
   the supply- and/or return header (15,16) are mounted on a bracket (17) that is fastened to the outer frame (1) and includes a sloping surface with an aperture for receiving the supply- or return header therein,
   the cover pane (4), the outer frame (1) and the insulation layer with or without a backsheet form a casing and the supply- and/or return headers (15,16) are disposed close to the bottom of the casing, and the sloping surface is countersunk in the casing so that the portion of the supply- and/or return header projecting outwardly from the sloping surface does not protrude from the casing.

2. A solar collector according to claim 1, wherein the sloping surface extends all the way up to a side panel of the outer frame (1) so that the countersunk area opens up to the side panel thereby allowing a key for tightening a nut or ring of the headers to be inserted into the countersunk area.

3. A solar collector according to claim 2, wherein the aperture (19) has a non-circular perimeter and said supply- and/or return header (15,16) has a matching cross-sectional shape.

4. A solar collector according to claim 3, wherein said sloping surface is part of a plate (18) with the aperture (19) formed therein, whereby the perimeter of the aperture is at least in part formed by plate material that is bend over about 90° to form one or more lips (19a) that increase the contact area between said supply and/or return header and the plate.

5. A solar collector according to claim 1, wherein the aperture (19) has a non-circular perimeter and said supply- and/or return header (15,16) has a matching cross-sectional shape.

6. A solar collector according to claim 5, wherein said sloping surface is part of a plate (18) with the aperture (19) formed therein, whereby the perimeter of the aperture is at least in part formed by plate material that is bend over about 90° to form one or more lips (19a) that increase the contact area between said supply and/or return header and the plate.

* * * * *